(12) United States Patent
Park

(10) Patent No.: US 9,976,740 B2
(45) Date of Patent: May 22, 2018

(54) BURNER

(71) Applicant: Chanwoo Park, Reno, NV (US)

(72) Inventor: Chanwoo Park, Reno, NV (US)

(73) Assignee: Board of Regents of the Nevada Systems of Higher Educations, on Behalf of the University of Nevada, Reno, Reno, NV (US)

( * ) Notice: Subject to any disclaimer, the term of this patent is extended or adjusted under 35 U.S.C. 154(b) by 434 days.

(21) Appl. No.: 13/916,538

(22) Filed: Jun. 12, 2013

(65) Prior Publication Data
US 2013/0330676 A1    Dec. 12, 2013

Related U.S. Application Data

(60) Provisional application No. 61/658,820, filed on Jun. 12, 2012.

(51) Int. Cl.
*F23D 14/16* (2006.01)
*F23D 14/66* (2006.01)

(52) U.S. Cl.
CPC ............. *F23D 14/66* (2013.01); *F23D 14/16* (2013.01); *F23D 2203/106* (2013.01); *F23D 2212/10* (2013.01); *F23D 2212/201* (2013.01); *Y02E 20/348* (2013.01)

(58) Field of Classification Search
CPC ...................................................... F23D 14/16
USPC ........................................................ 431/215
See application file for complete search history.

(56) References Cited

U.S. PATENT DOCUMENTS

| | | | | |
|---|---|---|---|---|
| 241,077 A | * | 5/1881 | Siemens | F23L 15/02 431/215 |
| 2,201,024 A | * | 5/1940 | Brown, Jr. | B22D 19/0063 164/94 |
| 2,976,853 A | * | 3/1961 | Hunter | F22B 31/0023 110/264 |
| 3,173,470 A | * | 3/1965 | Wright | F23D 14/16 431/160 |
| 3,595,310 A | * | 7/1971 | Burne | F28F 13/003 165/159 |
| 3,684,260 A | * | 8/1972 | Solbrig | F23D 14/16 165/6 |
| 3,912,443 A | * | 10/1975 | Ravault | B32B 18/00 431/328 |
| 4,364,726 A | * | 12/1982 | Forster | C21B 9/00 165/166 |

(Continued)

FOREIGN PATENT DOCUMENTS

| | | | | |
|---|---|---|---|---|
| EP | 1016826 A2 | * | 7/2000 | ............ F23D 14/16 |
| EP | 1016827 A2 | * | 7/2000 | ............ F23D 14/16 |

(Continued)

*Primary Examiner* — Kenneth Rinehart
*Assistant Examiner* — Logan Jones
(74) *Attorney, Agent, or Firm* — Klarquist Sparkman, LLP

(57) ABSTRACT

A superadiabatic burner has a flame holder formed from a porous medium, a fuel inlet coupled to the flame holder, a fuel outlet coupled to the flame holder, a preheater comprising an inlet and an outlet coupled to the fuel inlet, and a radiating rod coupled to the porous medium. The porous medium comprises a first porous section and a second porous section. Methods of using the burner allow preheated air or other mixtures to be provided to the fuel inlet as part of a fuel air mixture for the burner.

10 Claims, 17 Drawing Sheets

(56) References Cited

U.S. PATENT DOCUMENTS

| | | | | |
|---|---|---|---|---|
| 4,416,325 A * | 11/1983 | Barratt | ............... | F23L 15/04 110/254 |
| 4,479,535 A * | 10/1984 | Echigo | ............... | F23C 3/002 126/91 A |
| 4,602,673 A * | 7/1986 | Michelfelder | ..... | B01D 53/8631 165/10 |
| 4,643,667 A * | 2/1987 | Fleming | ............... | F23D 14/16 431/328 |
| 5,165,884 A * | 11/1992 | Martin | ............... | B01J 8/06 110/190 |
| 5,249,953 A * | 10/1993 | Roth | ............... | F23D 14/16 126/92 AC |
| 5,320,518 A * | 6/1994 | Stilger | ............... | B01J 8/06 122/4 D |
| 5,522,723 A * | 6/1996 | Durst | ............... | F23C 13/00 122/4 D |
| 5,711,661 A * | 1/1998 | Kushch | ............... | F23D 14/12 431/326 |
| 5,725,366 A * | 3/1998 | Khinkis | ............... | F23C 3/006 431/10 |
| 5,890,886 A * | 4/1999 | Doker | ............... | F23C 99/006 431/170 |
| 5,901,700 A * | 5/1999 | Suzuki | ............... | F23C 13/02 126/350.1 |
| 5,921,763 A * | 7/1999 | Martin | ............... | F23G 5/46 122/40 |
| 6,071,116 A * | 6/2000 | Philippe | ............... | C03B 5/235 431/11 |
| 6,159,001 A * | 12/2000 | Kushch | ............... | F24H 1/44 122/4 D |
| 6,257,868 B1 * | 7/2001 | Durst | ............... | F23C 99/006 431/11 |
| 6,289,851 B1 * | 9/2001 | Rabovitser | ............... | F22B 31/04 122/240.2 |
| 6,458,217 B1 * | 10/2002 | Li | ............... | C21D 1/76 148/235 |
| 7,104,784 B1 * | 9/2006 | Hasegawa | ............... | F23C 9/00 431/11 |
| 7,931,709 B2 * | 4/2011 | Franz | ............... | B01J 8/025 422/187 |
| 2004/0096391 A1 * | 5/2004 | Franz | ............... | B01J 8/025 423/650 |
| 2010/0139810 A1 * | 6/2010 | Jorgensen | ............... | F23D 14/02 148/194 |
| 2010/0330510 A1 * | 12/2010 | Pfefferle | ............... | F23C 13/06 431/8 |

FOREIGN PATENT DOCUMENTS

| | | | | |
|---|---|---|---|---|
| GB | 1414386 A | * | 11/1975 | ............ F23D 14/12 |
| JP | 54124335 A | * | 9/1979 | |
| WO | WO 9619698 A1 | * | 6/1996 | ............ F23D 14/18 |

\* cited by examiner

FIG. 4
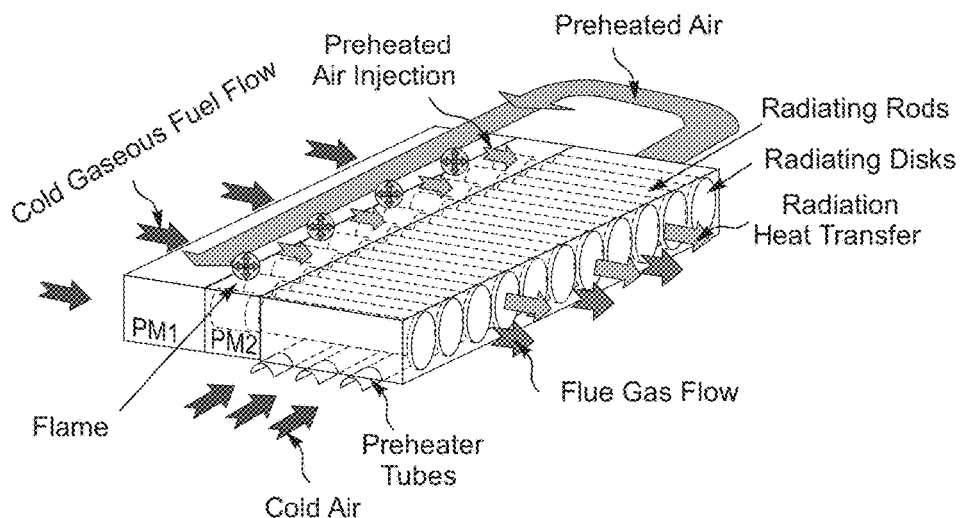
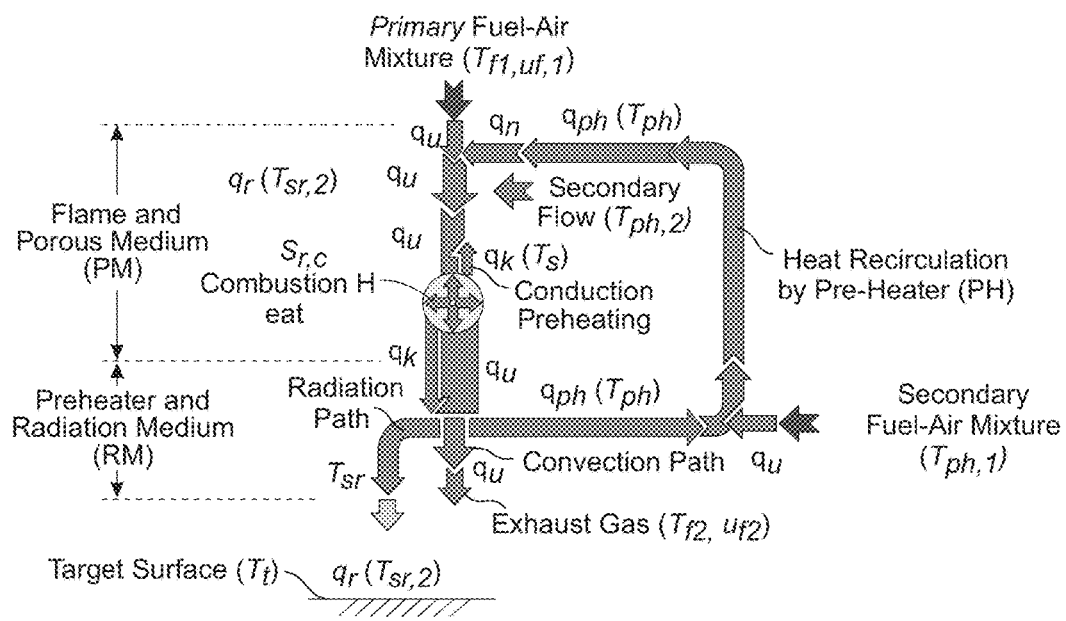

FIG. 5

| Dimensions | | | | | | | |
|---|---|---|---|---|---|---|---|
| $W$ [m] | $H$ [m] | $L$ [m] | $N_{rr}$ | $N_{tube}$ | $D_{tube}$ [m] | $A_{sr}/A_t$ | $A_{fit}/A_t$ |
| 0.302 | 0.302 | 0.126 | 121 | 30 | 0.01 | 70% | 45% |

| PM$_1$ | | PM$_2$ | |
|---|---|---|---|
| Material | Al$_2$O$_3$ foam | Material | Al$_2$O$_3$ foam |
| $\varepsilon_1$ | 0.835 | $\varepsilon_2$ | 0.87 |
| $\varepsilon_{r,1}$ | 1 | $\varepsilon_{r,2}$ | 1 |
| $d_{p,1}$ [cm] | 0.029 | $d_{p,2}$ [cm] | 0.152 |
| $<k>_s$ [W/m-K] | 1.21 | $<k>_s$ [W/m-K] | 3.84 |
| $\rho_s$ [kg/m$^3$] | 510 | $\rho_s$ [kg/m$^3$] | 510 |
| $c_{p,s}$ [J/kg-K] | 824 | $c_{p,s}$ [J/kg-K] | 824 |

| Radiation Rod | | Fuel | |
|---|---|---|---|
| Material | Carbon Steel | Type | Propane (C$_3$H$_8$) |
| $k$ [W/m-K] | 50 | MW [kg/kmol] | 44 |
| Melting Point [K] | 1750-1850 | $(P_f/P_t)_{st}$ | 1/16.70 |
| Diameter [m] | 0.014 | $-\Delta h_{t,F}$ [J/kg] (HHV) | 50.4 x 10$^6$ |

FIG. 7

Governing and Formulation

☐ Mass & fuel species conservation equations in porous media $$\frac{\partial}{\partial x}(\varepsilon \rho_g u_g) = 0$$

$$\varepsilon \rho_g u_g \frac{\partial Y_{F,g}}{\partial x} = \frac{\partial}{\partial x}\left\{\varepsilon \rho_g D_g \frac{\partial Y_{F,g}}{\partial x}\right\} Y_{F,g} + \varepsilon \dot{n}_{g,r,F}$$

☐ Energy conservation equations in porous media $$\varepsilon(\rho c_p)_g u_g \frac{\partial T_g}{\partial x} = \frac{\partial}{\partial x}\left\{\varepsilon k_g \frac{\partial T_g}{\partial x}\right\} + \langle Nu\rangle_{D,p} \frac{k_g}{D_p}\left[\frac{A_{gs}}{V}\right](T_s - T_g) + \varepsilon \dot{n}_{g,r,F}\Delta h_{r,F}$$

$$\frac{\partial}{\partial x}\left\{(1-\varepsilon)k_s \frac{\partial T_s}{\partial x}\right\} + \langle Nu\rangle_{D,p} \frac{k_g}{D_p}\left[\frac{A_{gs}}{V}\right](T_g - T_s) = 0$$

☐ Heat transfer of radiation rod fins $$\frac{d}{dr}\left[r\frac{d\theta}{dr}\right] = \frac{h}{kw} r\theta, \quad \theta = \frac{T - T_{\infty}|_{fin}}{T_b - T_{\infty}|_{fin}}$$

$$B.C. \begin{cases} r = R_b, & \theta = 1 \\ r = R_{Fin}, & \frac{d\theta}{dr} = 0 \end{cases}$$

☐ Preheater using cross-flow configuration $e$-$NTU$ Method

☐ Heat Transfer of Radiation Rod

Conduction through rod & convection to air are considered.

BURNER

CROSS-REFERENCE TO RELATED APPLICATION

This application claims the benefit of U.S. Provisional Application No. 61/658,820, which was filed on Jun. 12, 2012 and is incorporated herein by reference in its entirety.

FIELD

The present disclosure relates to burners, such as a superadiabatic burner.

SUMMARY

Certain features and advantages of the disclosed subject matter are described in the appended claims. Additional features and advantages will be apparent to the person of ordinary skill in the art as this specification proceeds.

In one embodiment, a superadiabatic burner comprises a flame holder formed from a porous medium, a fuel inlet coupled to the flame holder, a fuel outlet coupled to the flame holder, a preheater comprising an inlet and an outlet coupled to the fuel inlet, and a radiating rod coupled to the porous medium. The porous medium comprises a first porous section and a second porous section.

In other embodiments, at least one radiating disk is coupled to respective ones of the at least one radiating rod. The radiating rod can be coupled to an interface of the first and second porous sections. The first or second porous sections can be formed of ceramic material and/or metallic materials. In some embodiments, the first or second porous medium comprises metallic fibers, screens, or foam. The one or more radiating rods can include fins. The preheater inlet can be coupled to a source of colder air, which is heated by being placed proximate the radiating rod to provide heated air to the fuel inlet as part of a fuel air mixture for the burner. In another embodiment, the flame holder generates a flame at an interface of the first and second porous sections.

In another embodiment, a method of preheating gaseous fluids in superadiabatic burners is provided. The can include delivering a primary fuel mixture to a flame holder formed from a porous medium, the flame holder comprising a fuel inlet and a fuel outlet; establishing a flame inside the flame holder with the primary fuel mixture and heating one or more radiating rod coupled to the porous medium; delivering a gaseous fluid to an inlet of a preheater and passing the gaseous fluid through one or more passageways of the preheater to an outlet of the preheater, the outlet being coupled to the fuel inlet, the one or more passageways being in heat transfer contact with the heated one or more radiating rods to raise the temperature of the gaseous fluid as it passes through the one or more passageways; and mixing the raised temperature gaseous fluid with the primary fuel mixture and delivering the mixture of raised temperature gaseous fluid and primary fuel mixture to the porous medium. The mixture of raised temperature gaseous fluid and primary fuel mixture can be ignited to generate a local superadiabatic temperature inside the porous medium.

In some embodiments, the gaseous fluid is air or a mixture of air and propane. The primary fuel mixture is a first mixture of air and propane and the gaseous fluid is a second mixture of air and propane. In other embodiments, the gaseous fluid and/or primary fuel mixture can comprise other combustible fluids. The porous medium can include a first porous section and a second porous section and the act of establishing a flame inside the flame holder can include establishing a flame at an interface of the first and second porous sections. Radiating disks can be coupled to the one or more radiating rods and a radiant surface can be provided at the one or more radiating disks that is at or near the superadiabatic temperature. Radiation heat can be delivered from the radiant surface to a target surface.

In some embodiments, the one or more radiating rods can include fins and the heat transfer contact can be between respective fins of the one or more radiating rods and the gaseous fluid as the gaseous fluid passes through the one or more passageways. The heating of the gaseous fluid can expand the fuel lean limit and increase the inlet temperature of the mixture of raised temperature gaseous fluid and primary fuel mixture. In other embodiments, the temperature of the radiant surface exceeds a temperature of gas exiting the flame holder. In some embodiments, the temperature of the radiant surface does not exceed 1600 K.

In this regard, it is to be understood that the claims provide a brief summary of varying aspects of the subject matter described herein. The various features described in the claims and below for various embodiments may be used in combination or separately. Any particular embodiment need not provide all features noted above, nor solve all problems or address all issues in the prior art noted above.

BRIEF DESCRIPTION OF THE DRAWINGS

The patent of application file contains at least one drawing executed in color. Copies of this patent or patent application publication with color drawing(s) will be provided by the Office upon request and payment of the necessary fee.

FIG. 4 illustrates an exemplary SRB system.

FIG. 5 illustrates dimensions and thermophysical properties of an exemplary SRB system.

FIG. 7 illustrates certain governing and formulation equations.

DETAILED DESCRIPTION

Unless otherwise explained, all technical and scientific terms used herein have the same meaning as commonly understood by one of ordinary skill in the art to which this disclosure belongs. In case of conflict, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together. Although methods and materials similar or equivalent to those described herein can be used in the practice or testing of the present disclosure, suitable methods and materials are described herein. The disclosed materials, methods, and examples are illustrative only and not intended to be limiting.

Radiant porous burners, such as propane radiant porous burner, are used, for example, for drying and other farm-related processes. Their efficiency is typically under 25 percent and decreases with radiating surface temperature (which is characterized by thermal radiation emissive wavelength). The present disclosure provides a radiant burner, such as a porous burner, that uses air preheating to create a superadiabatic region in the burner. Radiation corridors begin in the superadiabatic region and effectively transport radiation to the surface. In some implementations, burner efficiency is about 43 percent. In further implementations, burner efficiency is greater than about 25 percent or between about 25 percent and about 43 percent. In some implementations, the radiant burner is constructed from a metallic substance. In further implementations, the burner has optimized heat exchanger/transport components.

Figure 1:
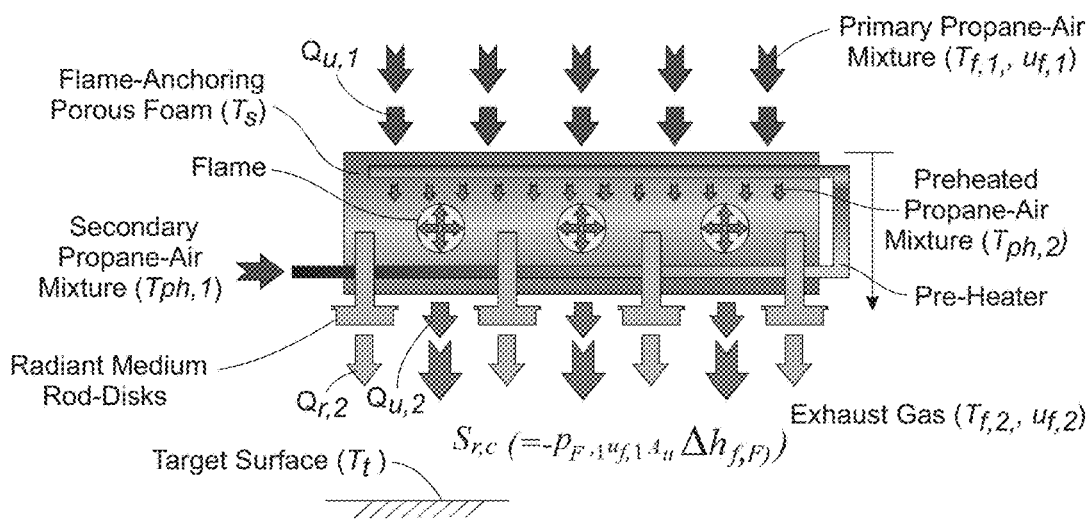
FIG. 1 illustrates an exemplary superadiabatic radiant burner (SRB) based on the present disclosure.

Through internal heat recirculation (as in flame held inside a porous medium), it is possible to raise the reacting gas temperature locally to above the adiabatic temperature (superadiabatic) before it eventually returns to the adiabatic temperature further downstream. Commercial radiant burners typically use lower surface temperature than the adiabatic temperature for radiative heating and these are inherently not highly efficient (less than 20 percent). It does not appear that any attempt has been made to design a radiant burner to create the downstream radiation temperature higher than the adiabatic temperature using a preheater (external heat recirculation). The present disclosure provides a radiant burner, such as a propane radiant burner, operating at fuel lean conditions with superadiabatic radiation (Superadiabatic Radiant Burner, SRB). The burner is shown in FIG. 1.

The primary fuel-rich (the stoichiometry after mixing with preheated air is less than 0.4 stoichiometry) propane-air mixture enters a porous medium (PM) as the flame holder. This PM is generally a ceramic foam, but because of the lower flame temperature due to the fuel lean combustion, metallic structures (such as screens or fibers) may be used in some examples. Metallic structures may allow for more flexible or less expensive burner design.

Once the flame is established inside this PM, the combustion flue heat is recirculated through the preheater (PH), which will contain the secondary flow (in some cases, air only). The fuel-lean propane-air mixture of primary fuel-rich and secondary preheated air flows would then be ignited creating a local superadiabatic temperature inside the porous medium. From this superadiabatic region, heat conducting solids (like rod-disk elements) extend and then make up the radiant surface. This is referred to as the radiation rod (RR or radiation corridor).

Figure 2:
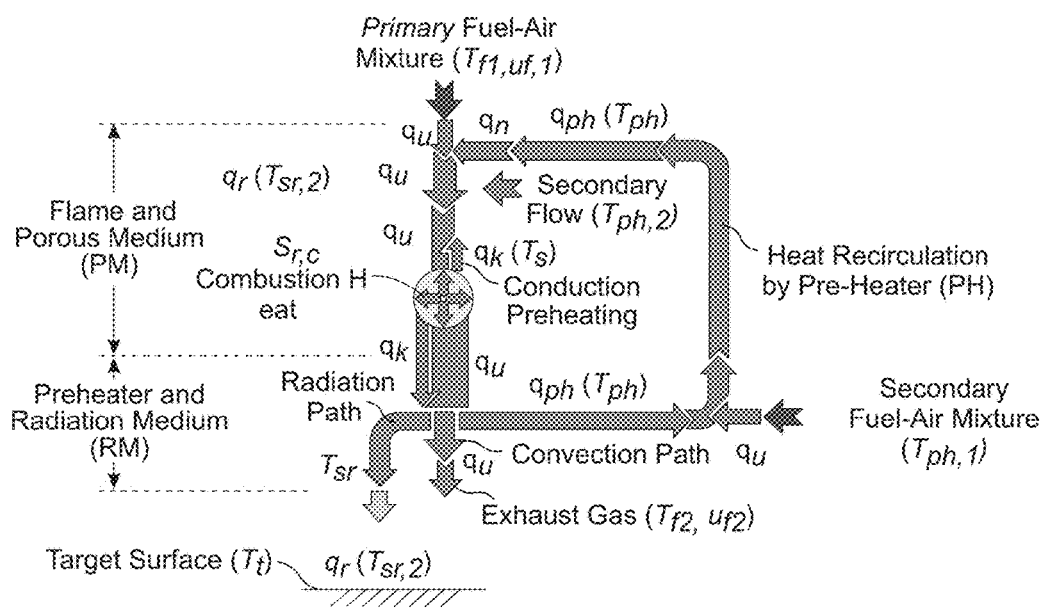
FIG. 2 illustrates heat recirculation of an exemplary SRB system.

The radiant surface at near superadiabatic temperature will deliver radiation heat to a target surface at higher efficiency than typical conventional designs. This heat recirculation is shown in FIG. 2.

Figure 3:
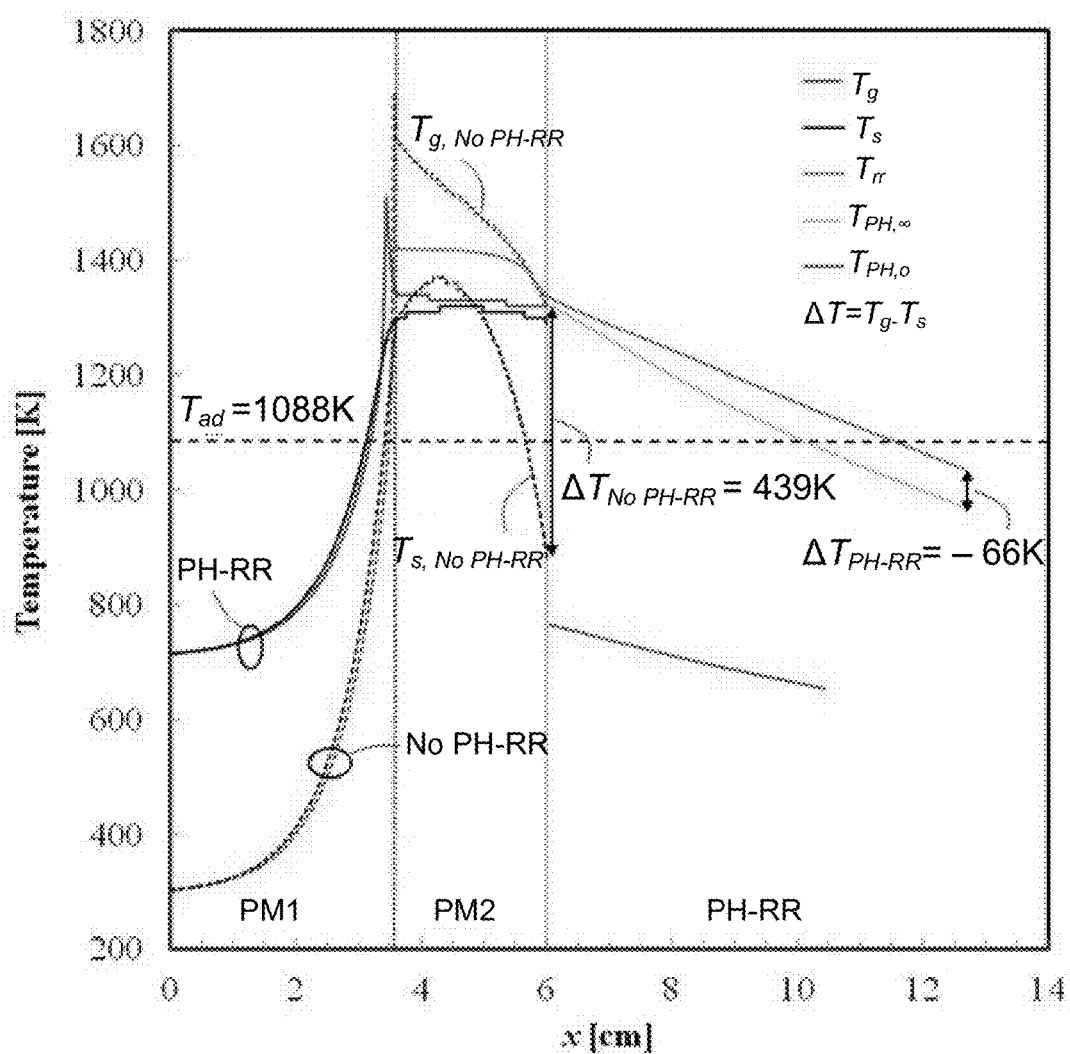
FIG. 3 illustrates temperature variations along the gas flow direction for the SRB and conventional systems.

FIG. 3 shows the temperature variations along the gas flow direction for the SRB and conventional systems. It is clearly shown from the figure that the radiation surface temperature of the SRB system is closer to the adiabatic temperature and higher than the gas exit temperature ($\Delta T=T_g-T_s=-66K$) as compared to the conventional system which shows a reversed temperature differential, i.e., the gas temperature is higher than the solid temperature ($\Delta T=T_g-T_s=439K$). In PM, the solid and fluid are in local thermal nonequilibrium. T is temperature. The results are at $u_f=0.10$ m/s and $\Phi=0.43$ The SRB design may increase the radiation surface temperature possible for stable operation. In a particular configuration, the system temperatures are minimized as appropriate to allow for the use of metallic parts (such as PM, PH, and RR). Since the heat exiting will be in part by convection (given by the exit gas temperature) and in part by radiation, it can be beneficial to minimize the temperature of the exiting gas while maintaining the radiation surface temperature close to a superadiabatic temperature.

The design of an example SRB system is shown in FIG. 4. The SRB system includes upstream porous medium (PM1), downstream porous medium (PM2), preheater and radiation rods. The flame is placed at the interface of PM1 and 2 where the finned radiation rods extract heat from the flame. Then, the extracted heat is conducted through the radiation rods and radiated from the radiating disks. The pre-heater based on a cross-flow heat exchanger configuration recuperates heat from the flue gas flow to preheat incoming cold air. The preheated air is injected and mixed with the cold fuel flow before entering the porous media. The dimensions and thermophysical properties of a specific SRB system according to an embodiment of the present disclosure are listed in the table shown in FIG. 5.

Figure 6:
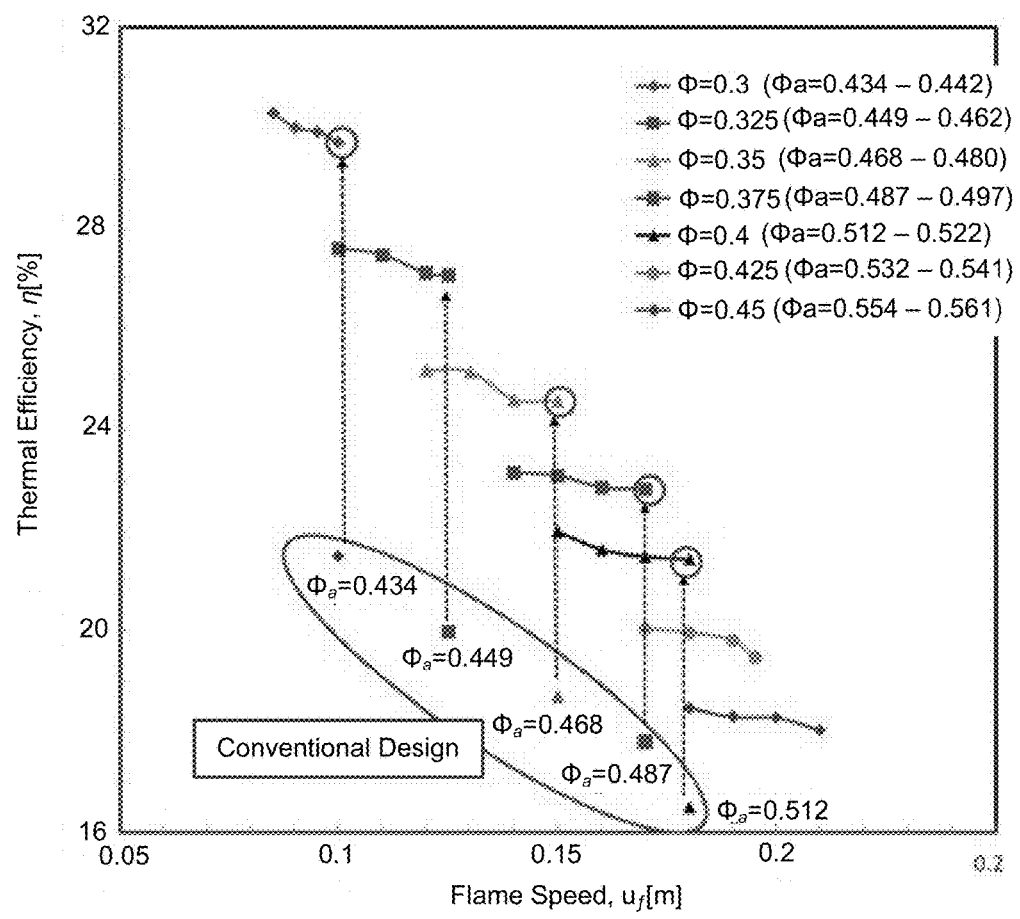
FIG. 6 provides a comparison of the thermal efficiency at different flame speeds and fuel ratios.
Figure 8:
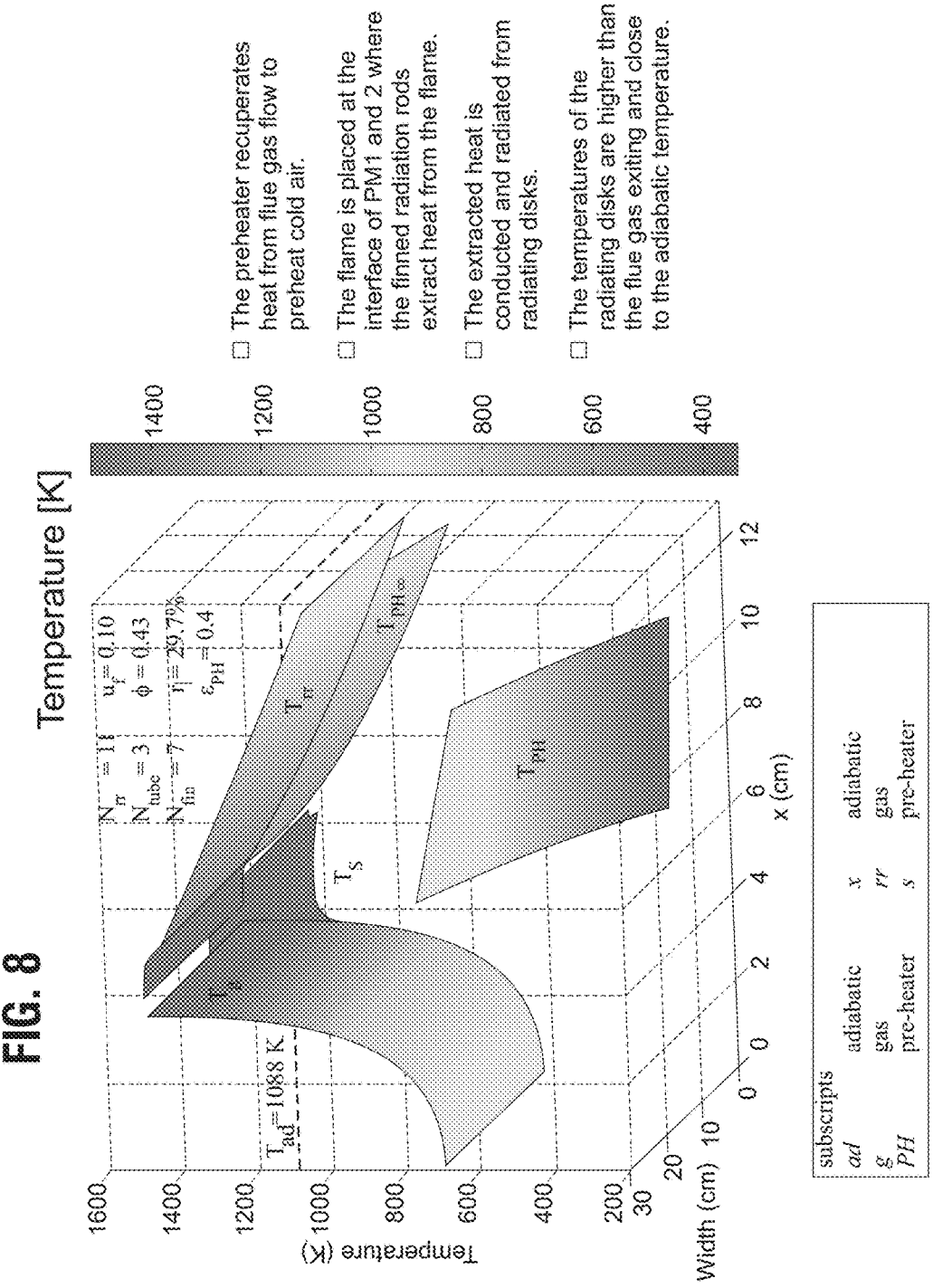
FIG. 8 illustrates temperature results from an exemplary SRB system.
Figure 9:
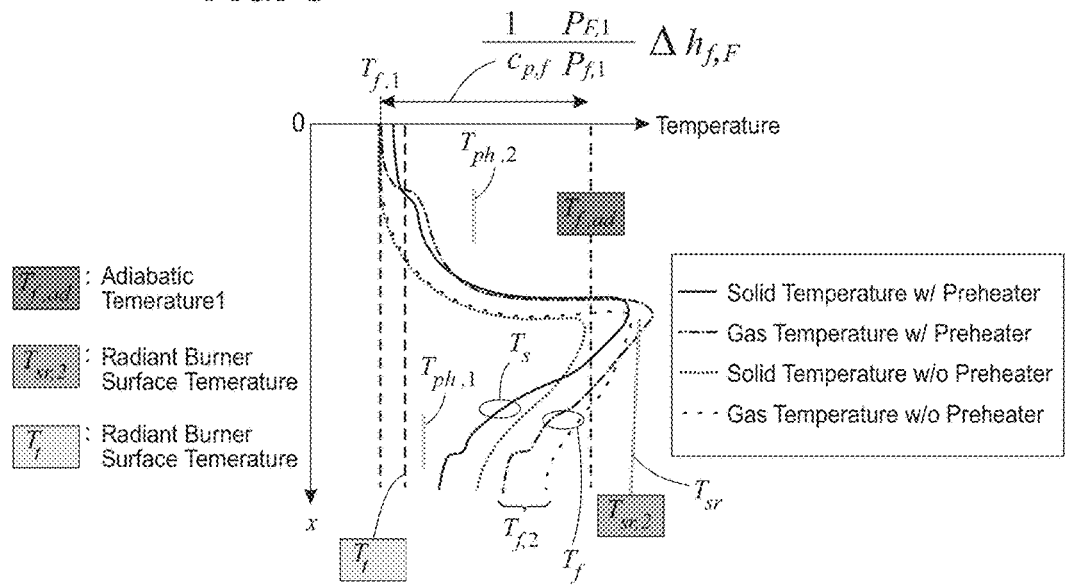
FIG. 9 illustrates temperature comparisons of an exemplary SRB system.
Figure 10:
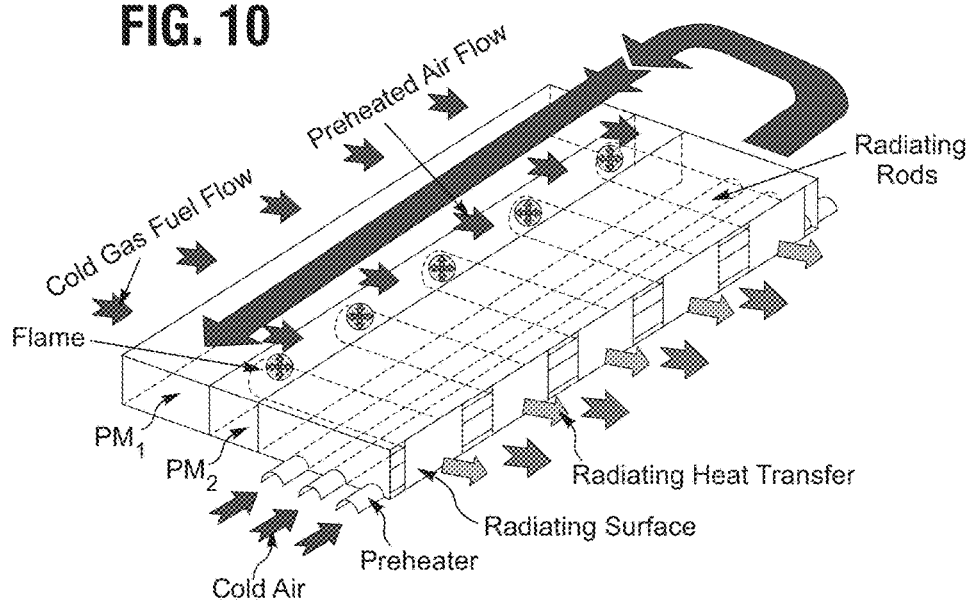
FIG. 10 illustrates an exemplary SRB system.
Figure 11:
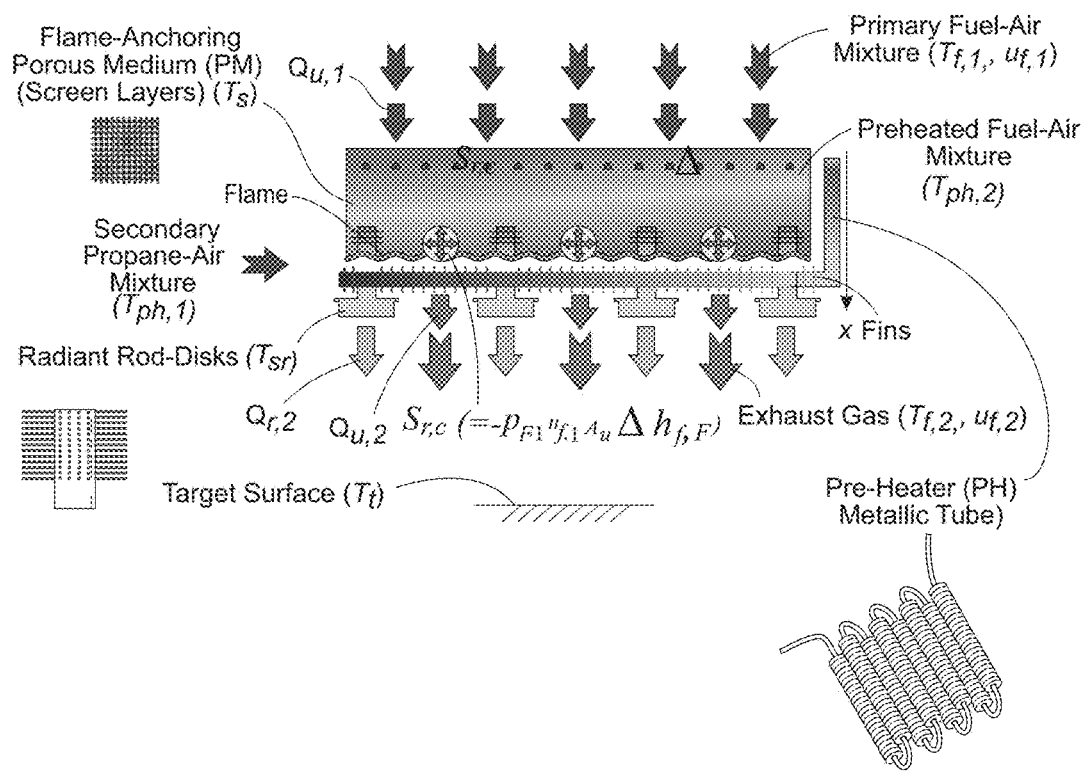
FIG. 11 illustrates an exemplary SRB system.

The comparison of the thermal efficiency at different flame speeds and fuel ratios is shown in FIG. 6. As shown in the figure, the thermal efficiency of the SRB system is much greater (38% increase at the lowest fuel ratio of 0.43) than the conventional design using only two-section porous media.

One reason for this improvement may be attributed to the higher radiation surface temperature than the gas exit temperature shown in FIG. 3, which is achieved by using preheater and radiation rods together. The preheater recuperates heat from flue gas flow to help fuel lean combustion. The radiation rods made of high thermal conductivity materials conduct the extract heat from flame to the radiation surface without losing heat to the cold flue gas.

It is also shown in FIG. 6 that the efficiency improvement is greater at the leaner fuel conditions. The preheating used for the SRB design expands the fuel lean limit and increases the inlet temperature of the fuel-air mixture which helps ignition. It should be noted that the maximum solid temperature is still below 1600 K so that metallic materials such as steel fibers and foam can be utilized.

In a specific design of the disclosed burning, the burner is made of all metallic porous media and radiation corridor and preheater. In a more specific design, the media is carbon or stainless steel or copper. The porous media is fabricated from, for example, pressed fine screens in PM1 and coarse ones in PM2. The fins of the radiation rod are either press joined/welded or machined. The fins of the preheater will follow the same. Other burners according to the present disclosure may be constructed differently or from different materials.

Additional details regarding the construction and operation of the disclosed burner are shown in FIGS. 7-11.

As discussed above, the novel structures disclosed herein provide effective preheating and radiation routing to increase efficiency of the burner. Flue gas heat can be recovered to increase the inlet air temperature and raises the flame temperature locally above the adiabatic temperature (superadiabatic flame) for the fuel-lean conditions. The heat from the superadiabatic region is then extracted and conducted through embedded, high-thermal conductivity radiation corridors and is radiated, at a higher temperature than the flue gas, to the target. The analyses of local thermal non-equilibrium among the gas phase, two-layer porous solid, preheating heat exchanger, and radiant corridor are presented for the zeroth-order reaction of premixed methane/air. Radiant burner efficiency over 45% is predicted.

Figure 12:
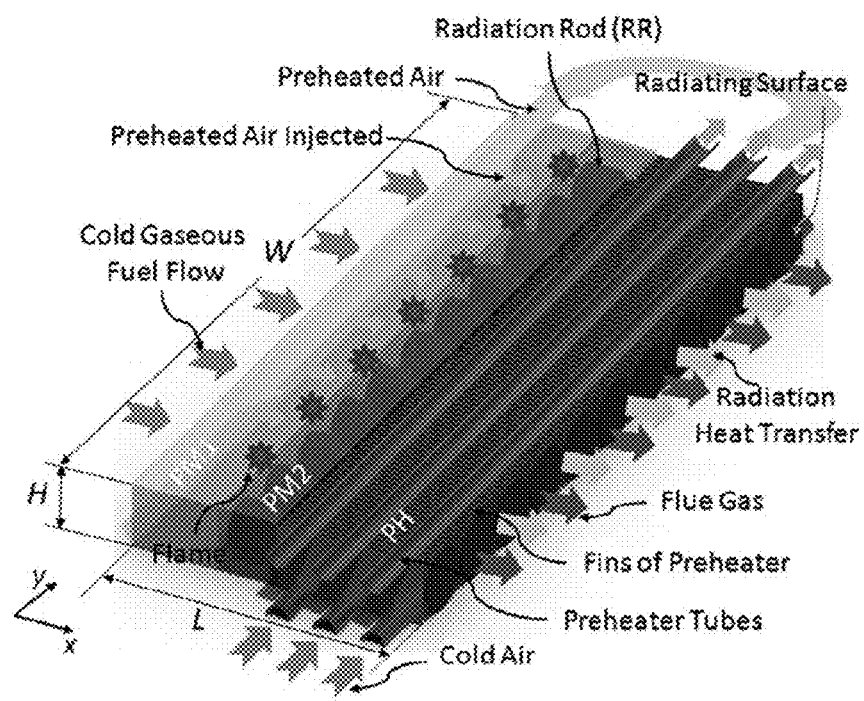
FIG. 12 illustrates a schematic view of an SRB with a two-layer porous media, a preheater and radiation rods showing gas flows and heat transfers.

FIG. 12 illustrates another example of a superadiabatic radiant porous burner with a two-layer porous media (PM1 and PM2), a preheater (PH) and radiation rods (RR) showing gas flows and heat transfers. Cold inlet air is heated by the preheater using hot flue gas from the porous burner. The preheated air is then mixed with the cold gaseous fuel flow in the upstream porous medium (PM1) with a fine porous structure. The downstream porous medium (PM2) with a coarse porous structure serves as a flame holder to stabilize the flame where the fins of the radiation rods are located.

Figure 13:
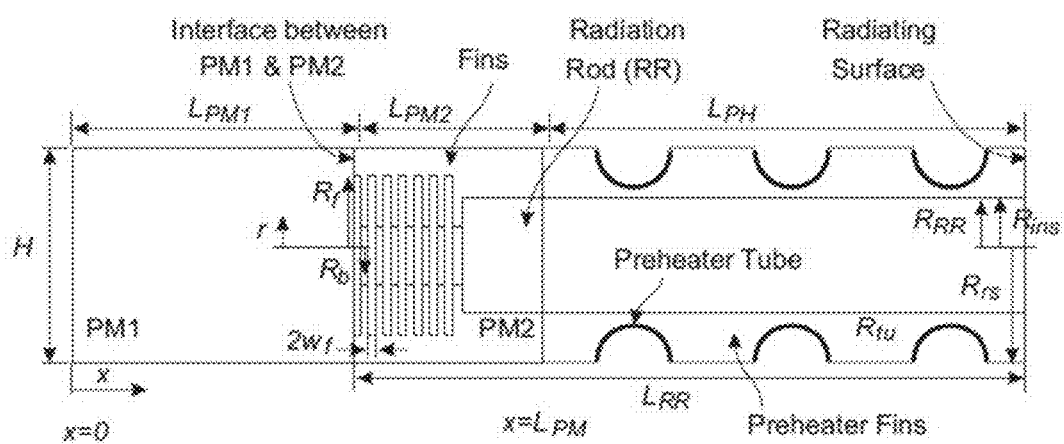
FIG. 13 illustrates a side view of a computational domain associated with the SRB shown in FIG. 12.
Figure 14:
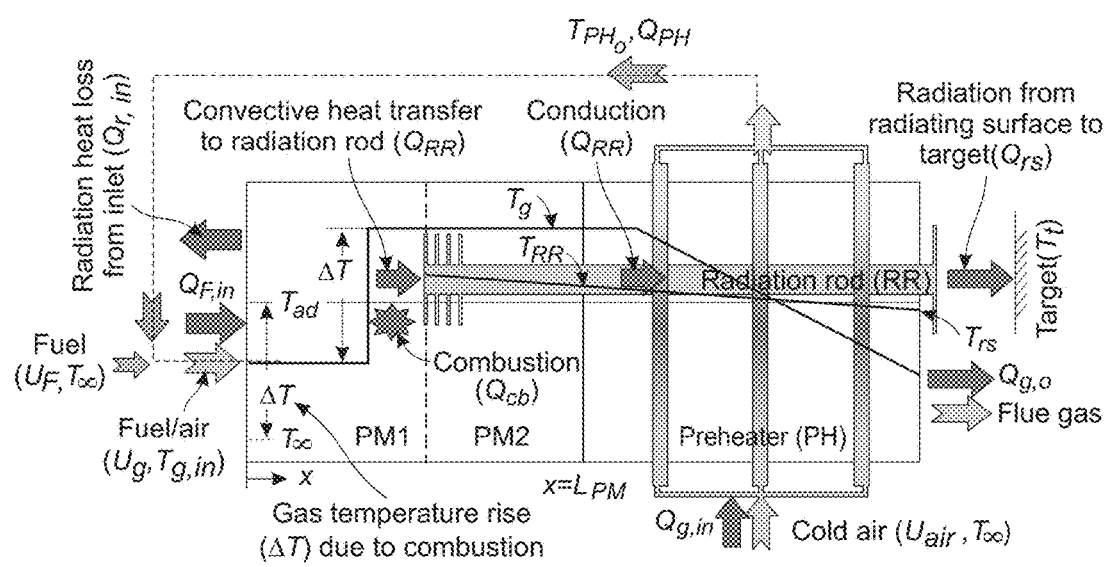
FIG. 14 illustrates a schematic diagram of the SRB system shown in FIG. 12, showing heat transfer, mass flow, and certain temperatures.

FIG. 13 illustrates a side view of a computation domain and FIG. 14 illustrates a schematic diagram of the superadiabatic radiant burner system showing heat transfer, mass flow, and key temperatures.

The heat transfers and mass flow in the superadiabatic radiant burner system are shown in FIG. 14. The combustion heat is extracted by the fins of the radiation rods (RR) and then conducted through the radiation rods to the radiating surfaces. The radiation rods made of a metallic material provide highly conducting paths from the flame to the radiating surfaces. The radiation rods are assumed to be coated with a low thermal conductivity material (thermal insulator) to reduce the heat loss to the colder surrounding flue gas being cooled by the preheater. Therefore, the combustion heat is efficiently transferred to the radiating surface at higher temperatures than the exiting flue gas temperature. As a result, the superadiabatic radiant burner can achieve higher thermal efficiency than the conventional burner.

TABLE 1

Thermophysical properties and dimensions of the superadiabatic radiant burner and coefficients of zeroth-order reaction model.

| Burner dimensions | | |
|---|---|---|
| Height, H (cm) | 2.54 | |
| Length, L (cm) | 12.1 | |
| Width, W (cm) | 30.0 | |

| Porous media | PM1 | PM2 |
|---|---|---|
| Length, $L_{PM}$ (cm) | 3.6 | 2.4 |
| Particle diameter, $D_P$ (mm) | 0.29 | 1.52 |
| Porosity, $\varepsilon$ | 0.835 | 0.87 |
| Emissivity, $\varepsilon_r$ | 1 | 1 |
| Thermal conductivity, $k_s$ (W/m K) | 0.2 | 0.1 |
| C | 0.638 | 0.146 |
| m | 0.42 | 0.96 |

| Radiation rod and fins of radiation rod | | | |
|---|---|---|---|
| Material | Carbon steel | $L_{RR}$ (cm) | 8.5 |
| Melting point (K) | 1750-1850 | $N_f$ | 7 |
| $k_{RR}$ (W/m K) | 50 | $R_f$ (cm) | 1.0 |
| $k_{ins}$ (W/m K) | 0.05 | $R_b$ (mm) | 2.0 |
| $R_{RR}$ (cm) | 0.7 | $R_{rs}$ (cm) | 1.2 |
| $R_{ins}$ (cm) | 0.75 | $w_f$ (mm) | 0.5 |

| Preheater | |
|---|---|
| $L_{PH}$ (cm) | 6.1 |
| Tube radius, $R_{tu}$ (mm) | 5.1 |
| Fin pitch (m$^{-1}$) | 314 |
| Flow passage hydraulic diameter, $D_h$ (mm) | 3.63 |
| Fin thickness (mm) | 0.33 |
| Free flow area/front area, $\sigma_{PH}$ | 0.534 |
| Heat transfer area/total volume (m$^2$/m$^3$) | 587 |
| Fin area/total area | 0.913 |
| Number of preheater tubes, $N_{tu}$ | 3 |

| Fuel, methane (CH$_4$) | |
|---|---|
| MW (kg/kmol) | 16 |
| $(\rho_{F,g}/\rho_g)_{stoich}$ | 1/18.12 |
| $-\Delta h_{r,F}$ (J/kg) (HHV) | 55.53 × 10$^6$ |

| Reaction model coefficients | |
|---|---|
| $a_r$ (1/s) | 4.8 × 10$^8$ |
| $\Delta E_a$ (J/kmol) | 1.3 × 10$^8$ |

Porous Burner

The porous burner consisting of upstream (PM1) and downstream (PM2) porous media as shown in FIG. 13 is analyzed using non-thermal equilibrium formulation. The thermophysical properties and dimensions of the burner system are presented in Table 1. The conservation equations of mass, gas species, and energy for gas and solid phases of the porous burner are given by $$\frac{\partial}{\partial x}(\varepsilon\rho_g u_g) = 0, \quad (1)$$

$$\varepsilon\rho_g u_g \frac{\partial Y_{F,g}}{\partial x} = \frac{\partial}{\partial x}\left(\rho_g D_{g,e}\frac{\partial Y_{F,g}}{\partial x}\right) + \varepsilon\dot{n}_{g,r,F}, \quad (2)$$

$$\varepsilon(\rho c_p u)_g \frac{\partial T_g}{\partial x} = \frac{\partial}{\partial x}\left(k_{g,e}\frac{\partial T_g}{\partial x}\right) + Nu_{D,p}\frac{k_g}{D_p}\left(\frac{A_{gs}}{V}\right)(T_s - T_g) + \varepsilon\dot{n}_{g,r,F}\Delta h_{r,F}, \quad (3)$$

$$0 = \frac{\partial}{\partial x}\left(k_{s,e}\frac{\partial T_s}{\partial x}\right) + Nu_{D,p}\frac{k_g}{D_p}\left(\frac{A_{gs}}{V}\right)(T_g - T_s). \quad (4)$$

The continuity, species and energy equations are discretized using finite volume method over the computational domain of the porous media (PM1 and PM2).

TABLE 2

Coefficients of the polynomial curvefit equations for the specific heat capacity and thermal conductivity of the gas phase.

$c_1 T^4 + c_2 T^3 + c_4 T + c_5$

|    | $c_{p,g}$ | $k_g$ |
|----|-----------|-------|
| $c_1$ | $1.3958 \times 10^{-10}$ | $2.930 \times 10^{-14}$ |
| $c_2$ | $-6.5412 \times 10^{-7}$ | $-1.3208 \times 10^{-10}$ |
| $c_3$ | $0.0010395$ | $2.0396 \times 10^{-7}$ |
| $c_4$ | $-0.44833$ | $-6.4181 \times 10^{-5}$ |
| $c_5$ | $1066.2$ | $0.033158$ |

The density of the gas flow is computed from the ideal gas law, in which the properties of the gas mixture are considered and is given by $$\rho_g = \frac{P_g}{R_g T_g}. \quad (5)$$

The interstitial convective heat transfer is modeled by the volumetric Nusselt number and is given by $$NU_{D,p} = C Re^m, \quad (6)$$

where C and m values are listed in Table 1. Re is the Reynolds number of the gas flow in the porous media and is given by $$Re = \varepsilon\rho_g u_g D_p / \mu \quad (7)$$

The specific volume of the porous media is given by $$A_{gs}/V = \varepsilon/D_p. \quad (8)$$

The effective thermal conductivity of the gas phase consists of diffusion and dispersion terms and is given by $$k_{g,e} = \varepsilon k_g + (\rho c_p)_g D_{xx}^d, \quad (9)$$

where the thermal diffusivity is given by $$D_{xx}^d = 0.5 \alpha_g Pe, \quad (10)$$

and the Peclet number is given by $$Pe = \rho_g c_p \varepsilon u_g D_p / k_g. \quad (11)$$

The Lewis number is assumed to be unity as below, $$Le = \frac{k_{g,e}/(\rho c_p)_g}{D_{g,e}} = 1, \quad (12)$$

where the mass diffusivity is given by $$D_{g,e} = \varepsilon D_g + D_{m_{xx}}^d. \quad (13)$$

The effective thermal conductivity of the solid phase consists of the volume-averaged thermal conductivity and the radiative thermal conductivity of the solid phase and is given by $$k_{s,e} = (1-\varepsilon)k_s + \varepsilon k_{s,r}, \quad (14)$$

where the radiative thermal conductivity is given by $$k_{s,r} = \frac{16\varepsilon_r \sigma_{SB} T_s^3}{3\sigma_e}. \quad (15)$$

The zeroth-order reaction rate is used to model the combustion of fuel/air mixture and is given by $$\dot{n}_{g,r,F} = -a_r e^{-\Delta E_a/R_g T_g}, \quad (16)$$

where the coefficients of the combustion model (ar and DEa) for premixed methane/air flow are listed in Table 1.

Since the specific heat capacity and thermal conductivity of the gas phase significantly vary with temperature, they are given as the functions of temperature by fourth-order polynomial equations listed in Table 2.

The perfect mixing of the preheated air and fuel is assumed at the inlet of the burner. The equivalence ratio of the fuel/air mixture is defined as $\varphi = (\rho_{F,g}/\rho_g)/(\rho_{F,g}/\rho_g)_{stoich}$. The velocity of the fuel/air mixture ($u_g$), entering the burner, is calculated by the mass conservation equation which is given by $$\rho_g u_g HW[1-\varphi(\rho_{F,g}/\rho_g)_{stoich}] = N_{tu}\rho_{air}u_{air}\pi R_{tu}^2 \quad (17)$$

The boundary conditions for the energy and species equations are presented below.

Inlet (x=0):

$$-(1-\varepsilon)k_s \frac{\partial T_s}{\partial x} = \varepsilon_r \sigma_{SB}(T_s^4 - T_g^4), \quad (18)$$

$$T_g = T_{g,in}, \quad (19)$$

$$Y_{F,g} = \phi\left(\frac{\rho_{F,g}}{\rho_g}\right)_{stoich}. \quad (20)$$

Outlet (x=$L_{PM}$):

$$-(1-\varepsilon)k_s \frac{\partial T_s}{\partial x} = \varepsilon_r \sigma_{SB}(T_s^4 - T_{PH,ave}^4), \quad (21)$$

-continued $$\frac{\partial T_g}{\partial x} = 0, \quad (22)$$

$$\frac{\partial Y_{F,g}}{\partial x} = 0. \quad (23)$$

It is assumed that the porous burner exchanges radiation heat at the outlet with the preheater at its average temperature. All the properties used for the numerical analysis are evaluated based on the mass-averaged mixture of air and fuel.

The governing equations of the porous burner are discretized using uniform grid nodes. The equations are solved by enough iteration until a convergence is achieved. The continuity equation of the gas flow, Eq. (1) is directly used to calculate the velocity at each node. The density of the gas flow is computed by ideal gas law. The initial temperature profiles for gas and solid phases with their peak temperatures at the interface of the upstream and downstream porous media are set to ignite the flame. Note that all properties are smoothed near the interface of two porous media to avoid numerical errors due to discontinuous properties. But the porosity of the porous media was allowed to vary across the interface (Eq. (4)).

Radiation Rods and Preheater

An exemplary radiation rods and preheater system are shown in FIG. 13 and FIGS. 15A-C. The radiation rod comprises (i) the radial fins located close to the interface of the two layers of the porous media, (ii) a stem and (iii) a radiating disk. The thermophysical properties and dimensions of the radiation rod and preheater are listed in Table 1.

The radial fins of the radiation rods are modeled by considering the convection and conduction heat transfers. The equations and boundary conditions are given by $$\frac{d}{dr}\left(r\frac{dT}{dr}\right) = \frac{rNu_{D,p}}{w_f(A_{gs}/V)D_p^2}(T - T_g), \quad (24)$$

$$T = T_b \text{ at } r = R_b, \quad (25)$$

$$\frac{dT}{dr} = 0 \text{ at } r = R_f, \quad (26)$$

where $w_f$ is the half thickness of each fin.

Figure 15A:
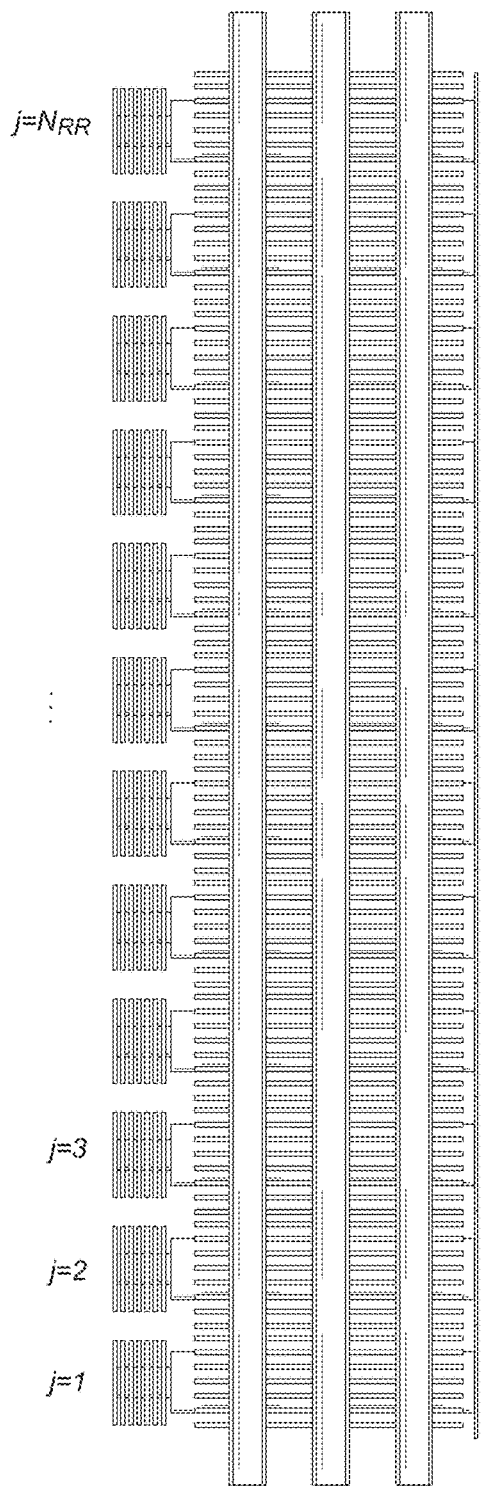
FIG. 15A illustrates a top view of an exemplary SRB system.
Figure 15B:
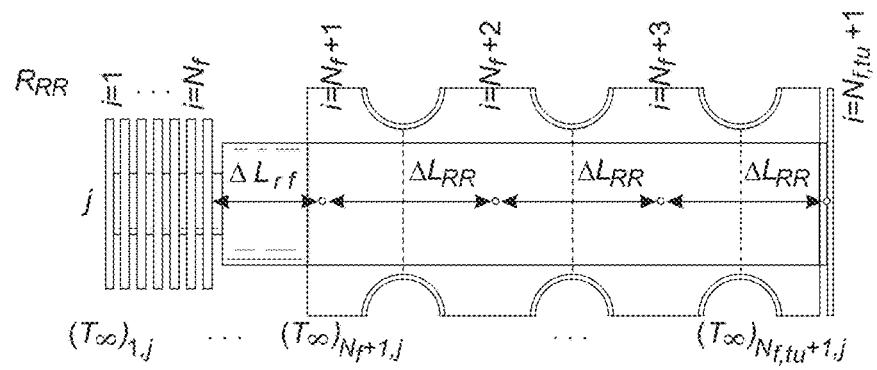
FIG. 15B illustrates a side view of the exemplary SRB system shown in FIG. 15A, showing a grid system of the radiation rods.

The convection heat transfer is considered for the radial fins with an insulated tip boundary condition. The stem of the radiation rod is divided to as many nodes as aligned with the preheater tubes as shown in FIG. 15B. The axial conduction only in the stem is considered because of the small temperature gradient in the radial direction. The radiation boundary condition is used at the radiating surface of the radiation rods.

The energy equations of the stem of the finned section of the radiation rods shown in FIG. 15B are given by $$-4R_{RR}w_f C_f k_{RR}[T_{i,j} - (T_\infty)_{i,j}] + \quad (27)$$
$$\frac{k_{RR}}{\Delta L_f}R_{RR}^2(T_{i+1,j} + T_{i-1,j} - 2T_{i,j}) = 0,$$
$$i = 1, \ldots, N_f,$$
where $$C_f = \frac{m[K_1(R_b m)I_1(R_f m) - K_1(R_f m)I_1(R_b m)]}{K_0(R_b m)I_1(R_f m) + K_1(R_f m)I_0(R_b m)}, \quad (28)$$

where $m = \{Nu_{D,p}k_g/[(A_{gs}/V)D_p^2 k_{RR} w_f]\}^{1/2}$ and perfect insulation is assumed as the boundary condition for the first node (i=1), i.e., $T_{oj} = T_{lj}$ It is assumed that the presence of the radiation rods embedded in the downstream porous medium (PM2) do not affect the combustion occurring in the upstream porous medium (PM1). However, the specific volume of the downstream porous medium (PM2), $A_{gs}/V$ is corrected considering the presence of the radiation rods and fins. Note that the burner is modeled as a one-dimensional system while the radiation rods and fins are modeled as two-dimensional systems.

The energy balance of the gas flow in the finned section of the radiation rods is given by $$\dot{m}_h c_{p,h}[(T_\infty)_{i,j} - (T_\infty)_{i+1,j}] + 4\pi R_{RR} w_f C_f k_{RR}[T_{i,j} - (T_\infty)_{i,j}] = 0, \, i=1, \ldots, N_f. \quad (29)$$

The unfinned section of the radiation rod is assumed to be insulated to reduce the heat loss to the surrounding gas flow and its energy equations are given by $$\pi R_{RR}^2 k_{RR}\left[\frac{T_{i+1,j} - T_{i,j}}{\Delta L_{RR}} - \frac{T_{i,j} - T_{i-1,j}}{\Delta L_{rf}}\right] - C_{ins}[T_{i,j} - (T_\infty)_{i,j}] = 0, \quad (30)$$
$$i = N_f + 1,$$

$$\pi R_{RR}^2 k_{RR}\left[\frac{T_{i+1,j} + T_{i-1,j} - 2T_{i,j}}{\Delta L_{RR}}\right] - C_{ins}[T_{i,j} - (T_\infty)_{i,j}] = 0, \quad (31)$$
$$i = N_f + 2, \ldots, N_{f,tu},$$

$$-\pi R_{RR}^2 k_{RR}\left[\frac{T_{i,j} - T_{i-1,j}}{\Delta L_{RR}}\right] - C_{ins}[T_{i,j} - (T_\infty)_{i,j}] = \quad (32)$$
$$\varepsilon_r A_{rs}\sigma_{SB}T_{i,j}^4 - \varepsilon_r A_t\sigma_{SB}T_t^4,$$
$$i = N_{f,tu} + 1,$$
where $$C_{ins} = \frac{2\pi\Delta L_{RR}}{\left[\frac{\ln(R_{ins}/R_{RR})}{k_{ins}} + \frac{1}{R_{ins}h_h}\right]}, \quad (33)$$

where the heat transfer coefficient is defined by the correlation of an appropriate compact heat exchanger and is given by $$h_h = 0.1566\left(\frac{\dot{m}_h D_h}{\sigma_{PH}HW\mu}\right)^{-0.389}\frac{\dot{m}_h c_{p,h}}{\sigma_{PH}HW Pr_h^{2/3}}. \quad (34)$$

and $T_t$ is the temperature of a target (heat sink).

The convective heat transfers between the flue gas, the radiation rod and the preheater are calculated in two steps. First the convective heat transfer to the radiation rod is calculated using the flue gas temperature, $T_\infty$ by Eq. (27) and Eqs. (30)-(32). Then the reduced flue gas temperature, $T_{\infty,PH}$ is used to calculated the energy conservation equations of the flue gas flow which is given by $$\dot{m}_h c_{p,h}[(T_\infty)_{N_f+i,j} - (T_{\infty,PH})_{i,j}] + C_{ins}[T_{N_f+i,j} - (T_\infty)_{i,j}] = 0, \, i=1, \ldots, N_{tu}. \quad (35)$$

TABLE 3

Stable range of the operation of conventional porous burner.

| Φ | 0.60 | 0.65 | 0.7 | 0.75 | 0.8 |
|---|---|---|---|---|---|
| $u_{g,max}$ (cm/s) | 11 | 14 | 33 | 47 | 63 |
| $u_{g,min}$ (cm/s) | 36 | 50 | 74 | 89 | 105 |
| $u_{g,max} - u_{g,min}$ | 25 | 36 | 41 | 42 | 42 |
| Experimental results from Khanna [24] | | | | | |
| $u_{g,max}$ (cm/s) | 15 | 15 | 32 | 50 | 70 |
| $u_{g,min}$ (cm/s) | 33 | 48 | 63 | 80 | 93 |
| $u_{g,max} - u_{g,min}$ | 18 | 33 | 31 | 30 | 23 |

Figure 15C:
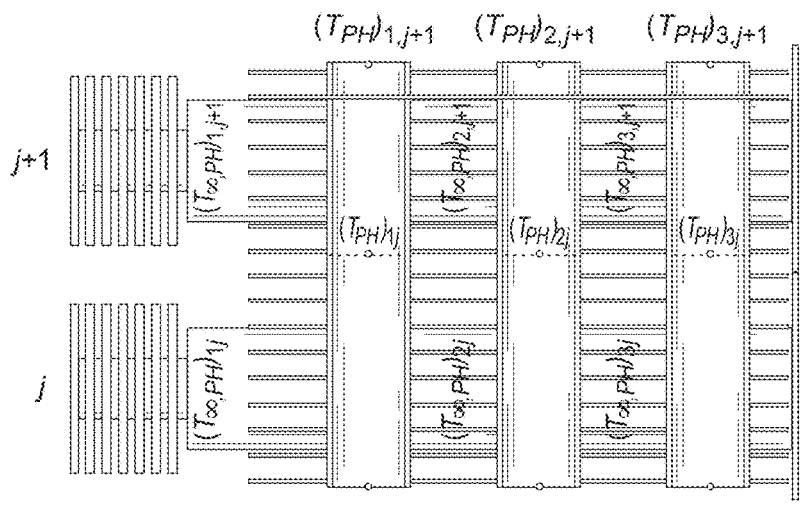
FIG. 15C illustrates a magnified part view of the preheater tubes of the exemplary SRB system shown in FIG. 15A, showing a grid system of the preheater tubes.

The heat transfer in the preheater tubes is modeled by $\epsilon$-NTU method in which each tube is considered separately and the tube length is also divided into small nodes to be aligned with the radiation rods as shown in FIG. 15C. The flow configuration of the preheater corresponds to the case where the air flow inside the preheater tubes is unmixed and the flue flow is mixed and the effectiveness of the preheater is given by $$\varepsilon = \frac{1 - \exp\{C_r[\exp[(-NTU) - 1]]\}}{C_r}, \quad (36)$$

where NTU is calculated by $$NTU = \frac{UA}{C_{min}}, \quad (37)$$

where U is the overall heat transfer coefficient of the preheater including the internal and external convective heat transfer coefficients. Each node of the preheater tube is solved to find the outlet air temperature of the node. The outlet air temperature is used as the inlet air temperature for the next adjacent node of the preheater tube. The air temperature in the preheater is calculated at the boundary of two adjacent nodes and is given by $$C_c[(T_{PH})_{i,j} - (T_{PH})_{i+1,j}] = \epsilon C_{min}[(T_{\infty,PH})_{i,j} - (T_{\infty,PH})_{i,j-1}], \quad (38)$$
$$j=1, \ldots, N_{RR}.$$

The temperature of the flue gas flow from each node, which is used as the ambient temperature for the radiation rods, is given by $$C_h[(T_{\infty,PH})_{i,j} - (T_\infty)_{i+1,j}] = \epsilon C_{min}[(T_{\infty,PH})_{i,j} - (T_{PH})_{i,j-1}], \quad (39)$$
$$j=1, \ldots, N_{RR}.$$

The algebraic equations governing the radiation rods and preheater are solved using the IMSL library.

The thermal efficiency of the burner is defined as the ratio of the radiation output to the target and the combustion heat and is defined by $$\eta = \frac{Q_{rs}}{Q_{cb}}, \quad (40)$$

where the radiation output is given by $$Q_{rs} = \Sigma(\epsilon_r A_{rs} \sigma_{SB} T_{rs}^4 - \epsilon_t A_t \sigma_{SB} T_t^4) \quad (41)$$

and the combustion heat is given by $$Q_{cb} = \phi_a \left(\frac{\rho_{F,g}}{\rho_g}\right)_{stoich} \rho_g u_g HW \Delta h_{r,F}. \quad (42)$$

The convective heat transfer ($Q_{RR}$ in FIG. 14) between the radiation rods and the gas flow is calculated using the gas temperature based on the equivalence ratio ($\varphi$). The gas temperature is lower than the actual gas temperature based on the actual equivalence ratio ($\varphi_a$), which allows a conservative calculation of the heat extraction by the radiation rods. The equivalence ratio based on the actual fuel supply is calculated by $$\phi_a = \frac{\phi}{1 - \eta}. \quad (43)$$

Heat Recirculation of Superadiabatic Radiant Burner

Figure 16A:
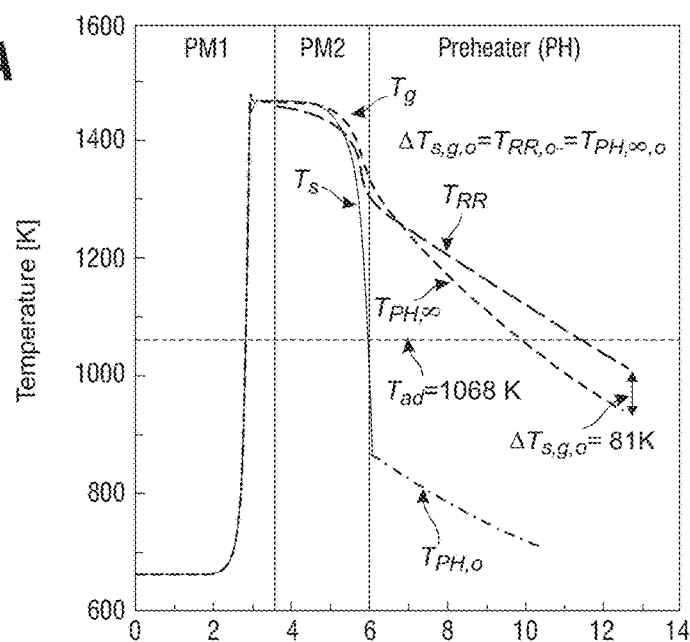
FIG. 16A illustrates temperature profiles of an exemplary SRB system.

It was found from the results of the numerical analysis that the flame speeds are in good agreement with the experimental results in Table 3. The superadiabatic radiant burner with two-layer porous burner (PM1 and PM2), a preheater (PH) and radiation rods (RR) was analyzed. The temperature profiles of the superadiabatic radiant burner are depicted in FIG. 16A. The conventional burner without preheater uses the inlet air at ambient temperature, while the superadiabatic burner uses an inlet air at higher temperatures because of the external heat recovery (preheating), and thus, expands the fuel lean limit of flammability. For the superadiabatic burner, the radiation rods made of a high thermal conductivity material are used to transfer the combustion heat efficiently from the flame to the radiating surface with a small temperature drop.

As a result of the preheating and separate heat transfer through the radiation rods, the temperature of the radiating surface is greater than the flue gas temperature and close to the adiabatic temperature. It is shown in FIG. 16A that, the radiating surface temperature is 81 K greater than that of the exit flue gas resulting in higher radiation efficiency. Note that the temperature at the interface of the porous media (between PM1 and PM2) was used as surrounding gas temperature of the fins of the radiation rods for the convective heat transfer which is a more conservative way for the heat transfer calculation.

Figure 16B:
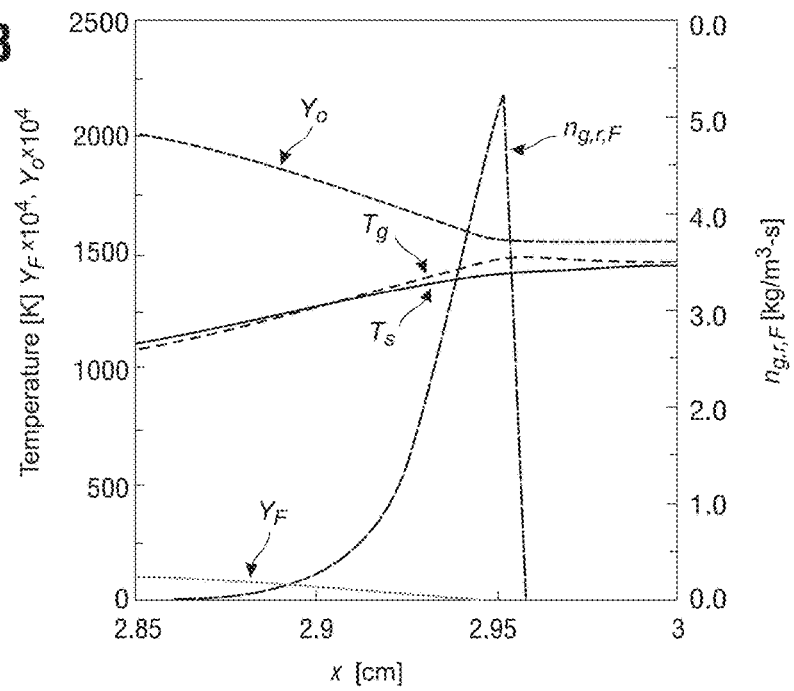
FIG. 16B illustrates variations of the temperatures for the gas and solid phases, including concentration of species and reaction rate in the porous media of an exemplary SRB near the flame location ($\Phi a=0.5$, $U=0.32$, $u_{air}=6$ cm/s).

The temperature and gas species profiles in the upstream porous medium (PM1) near the flame location are magnified in FIG. 16B. As shown in the figure, the gas temperature is slightly lower than the solid temperature near the inlet and then the gas temperature is higher than the solid temperature close to the flame. The heat transfer from the hotter solid to the incoming cold gas flow elucidates the internal heat recirculation which is in fact the heat transfer from the flame to the cold gas flow by solid matrix and is responsible for fuel-lean and superadiabatic combustion in the conventional porous burner. After the flame, the thermal equilibrium between the gas and solid phases is quickly achieved due to the interfacial convection heat transfer. It is also shown in FIG. 16B that the fuel is completely depleted by the combustion, but the excess oxygen is still left under fuel-lean conditions.

Figure 17:
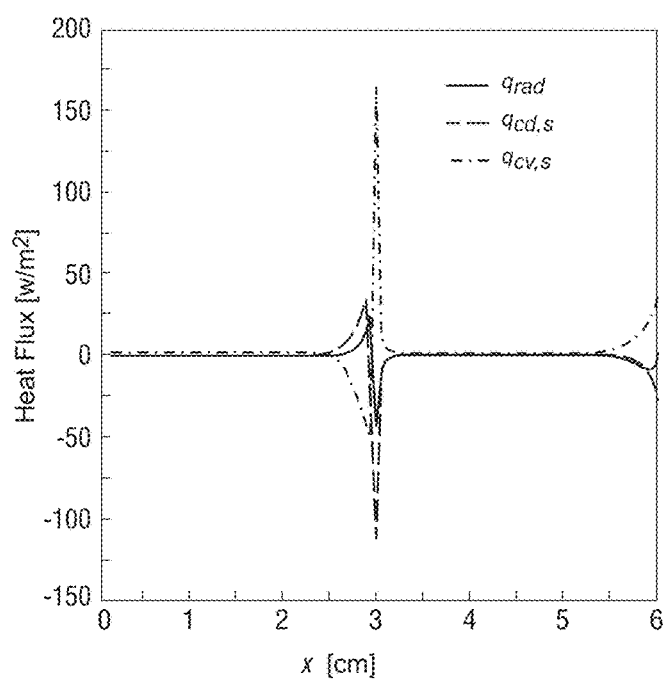
FIG. 17 is a graph showing heat transfer components of the solid phase ($\Phi a=0.5$, $\Phi=0.32$, $u_{air}=6$ cm/s).

The heat fluxes for the solid phase are shown in FIG. 4. The radiative, conductive and convective heat fluxes are given, respectively by $$q_{rad} = \int_w^e \frac{\partial}{\partial x}\left(\varepsilon k_{s,r}\frac{\partial T_s}{\partial x}\right)dx = \left(\varepsilon k_{s,r}\frac{\partial T_s}{\partial x}\right)_e - \left(\varepsilon k_{s,r}\frac{\partial T_s}{\partial x}\right)_w, \quad (44)$$

$$q_{cd,s} = \quad (45)$$
$$\int_w^e \frac{\partial}{\partial x}\left((1-\varepsilon)k_s\frac{\partial T_s}{\partial x}\right)dx = \left((1-\varepsilon)k_s\frac{\partial T_s}{\partial x}\right)_e - \left((1-\varepsilon)k_s\frac{\partial T_s}{\partial x}\right)_w,$$

where the integral limits (e and w) denote the right (east) and left (west) faces of each node, respectively which are commonly used in the finite volume method. It is shown in FIG. 17 that all the heat fluxes are much greater near the flame and at the outlet region of the porous burner, resulting in non-thermal equilibrium between the solid and gas phases. The radiation and conduction heat transfers are balanced with the interfacial convection heat transfer, which is referred to as the aforementioned internal heat recirculation. The combustion reaction causes a sharp rise in the gas temperature and thus the positive convection heat transfer (heat gain from the gas phase). In the outlet region, the radiation heat transfer from the burner surface to the preheater decreases the solid temperature lower than the gas temperature resulting in the positive convective heat transfer.

Figure 18:
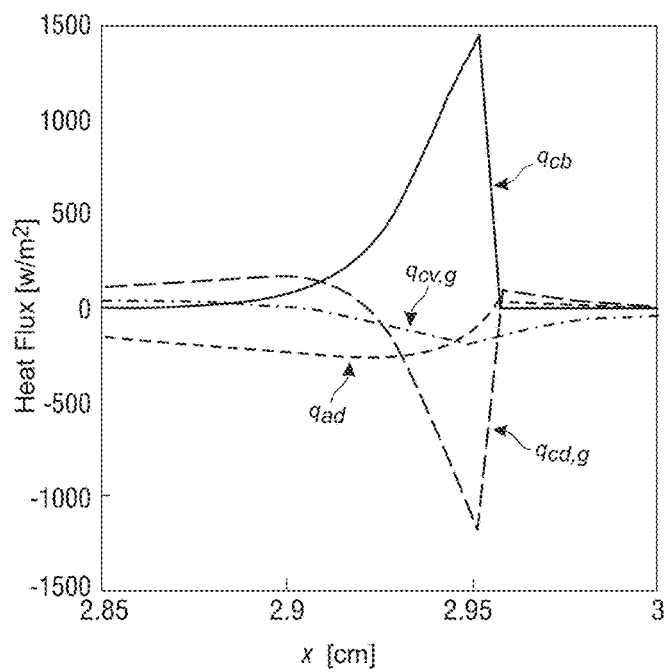
FIG. 18 is a graph showing heat transfer components of the gas phase ($\Phi a=0.5$, $\Phi=0.32$, $u_{air}=6$ cm/s).

The heat fluxes for the gas phase near the flame are shown in FIG. 18. The advective, conductive, convective, and combustion reaction heat fluxes are given by $$q_{ad} = \quad (47)$$
$$-\int_w^e \frac{\partial}{\partial x}\left[\varepsilon(\rho c_p u)_g \frac{\partial T_g}{\partial x}\right]dx = \left[\varepsilon(\rho c_p u)_g \frac{\partial T_g}{\partial x}\right]_e - \left[\varepsilon(\rho c_p u)_g \frac{\partial T_g}{\partial x}\right]_w,$$

$$q_{cd,g} = \int_w^e \frac{\partial}{\partial x}\left(k_{g,e}\frac{\partial T_g}{\partial x}\right)dx = \left(k_{g,e}\frac{\partial T_g}{\partial x}\right)_e - \left(k_{g,e}\frac{\partial T_g}{\partial x}\right)_w, \quad (48)$$

$$q_{cv,g} = -q_{cv,s} = \int_w^e \frac{\partial}{\partial x}\left[Nu_{D,p}\frac{k_g}{D_p}\left(\frac{A_{gs}}{V}\right)(T_s - T_g)\right]dx = \quad (49)$$
$$\left[Nu_{D,p}\frac{k_g}{D_p}\left(\frac{A_{gs}}{V}\right)(T_s - T_g)\right]_e - \left[Nu_{D,p}\frac{k_g}{D_p}\left(\frac{A_{gs}}{V}\right)(T_s - T_g)\right]_w,$$

$$q_{cb} = \int_w^e \frac{\partial}{\partial x}(\varepsilon \dot{n}_{g,r,F}\Delta h_{r,F})dx = (\varepsilon \dot{n}_{g,r,F}\Delta h_{r,F})_e - (\varepsilon \dot{n}_{g,r,F}\Delta h_{r,F})_w. \quad (50)$$

It is shown in FIG. 18 that the conduction heat transfer in the gas phase is dominant near the flame. It is also shown that the sign of the convective heat transfer is changed from positive (heat gain from the solid phase) to negative at the location where the gas phase temperature intersects with the solid phase temperature Preheating of Superadiabatic Radiant Burner The superadiabatic radiant burner combines the heat recovery by a preheater from the exit flue gas with the internal heat circulation in the porous burner. The external heat recovery (preheating) raises the inlet gas temperature and further expands the fuel lean flammability limit beyond that of the conventional porous burner.

The overall energy balance of the superadiabatic burner is given by $$Q_{cb} = Q_{rs} + Q_{r,in} + Q_g, \quad (51)$$

where $Q_{cb}$ is the combustion heat, $Q_{rs}$ is the radiation output to the heating target, $Q_{r,in}$ is the radiation loss to the surrounding at the inlet and $Q_g$ is the enthalpy loss by the flue gas and is given by $$Q_g = Q_{g,o} - (Q_{g,in} + Q_{F,in}), \quad (52)$$

where $Q_{g,o}$ is the energy carried by the flue gas, $Q_{g,in}$ is the energy carried by the air into the preheater, and $Q_{F,in}$ is the energy carried by the fuel to the burner as shown in FIG. 14. Dividing Eq. (51) by $Q_{cb}$, the normalized energy balance is given by $$1 = Q^*_{rs} + Q^*_{r,i} + Q^*_g. \quad (53)$$

Figure 19:
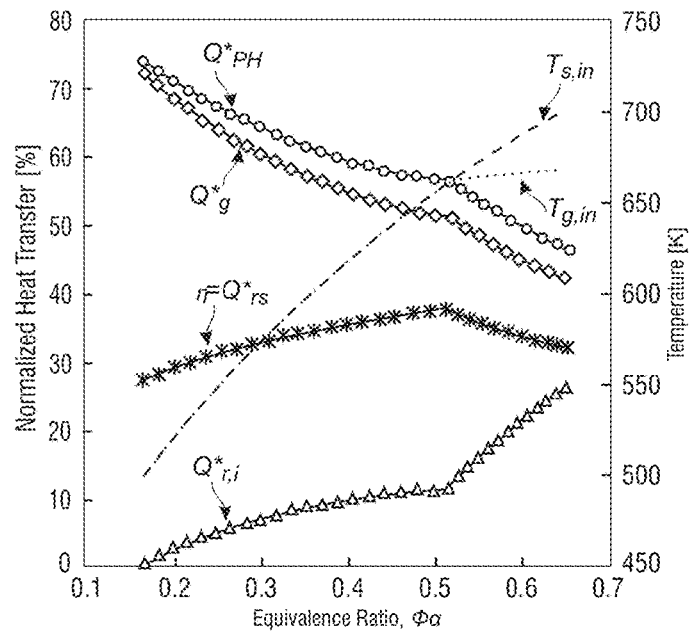
FIG. 19 is a graph showing normalized energy balance and the inlet temperatures of the solid and gas phases of the superadiabatic burner for different fuel equivalence ratios ($u_{air}=6$ cm/s).

Note that the normalized radiation output ($Q^*_{rs}$) is equal to the thermal efficiency ($\eta$) of the superadiabatic radiant burner. The normalized energy balance for the baseline condition (preheater air velocity $u_{air}$=0.06 m/s) is shown in FIG. 19. It is shown in FIG. 19 that the largest portion of the combustion energy is lost by the flue gas. As the combustion heat input (equivalence ratio) is increased, the flame temperature and radiation output are increased. At the same time, the radiation loss is also increased because of the increased solid temperature at the burner inlet due to the preheated inlet gas temperature. But at high equivalence ratios (>0.5), the radiation loss at the inlet is rapidly increased because of the high solid temperature of the burner at the inlet due to the flame proximity. It is also shown in FIG. 19 that the normalized heat recovery by the preheater ($Q^*_{PH}$) is decreased by increasing the equivalence ratio because the heat loss is increased. Note that the effectiveness of the preheater is decreased by increasing the equivalence ratio and ranges from 0.45 to 0.36.

Figure 20:
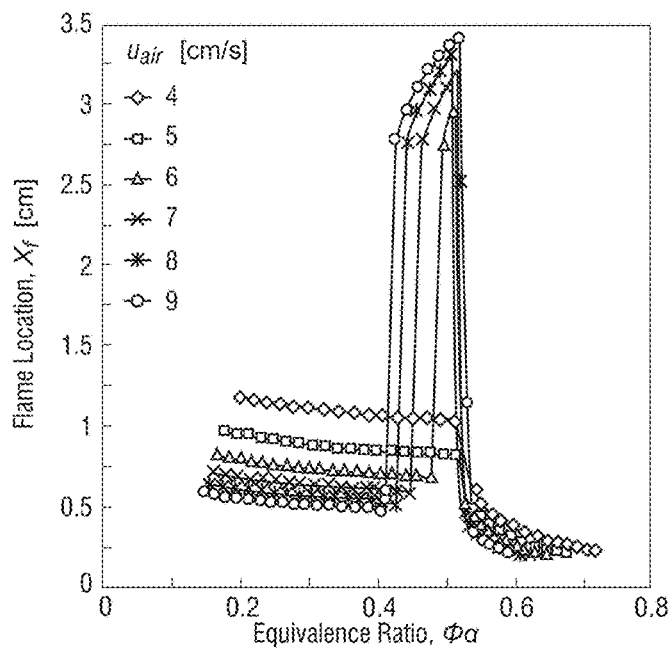
FIG. 20 is a graph showing variation of flame location for different fuel equivalence ratios and preheater air velocities.

The flame location in the upstream porous medium (PM1) for different preheating air velocities and equivalence ratios is depicted in FIG. 20. The preheating helps ignition of the fuel/air mixture especially at low equivalence ratios. The raised inlet gas temperature due to the preheating tends to draw the flame close to the inlet at low and high equivalence ratios. At intermediate equivalence ratios (0.4~0.51), the flame is located close to the interface of the porous media. Because the flame is far enough from the inlet of the burner, the burner temperature at the inlet ($T_{s,in}$) is close to the incoming gas temperature ($T_{g,in}$), and thus the radiation loss is rather minimal. At high equivalence ratios, however, the preheating draws the flame to the inlet and quickly raises the inlet burner temperature because of the proximity of the flame, and thus increases radiation loss resulting in decreased radiation output (FIG. 19).

Figure 21:
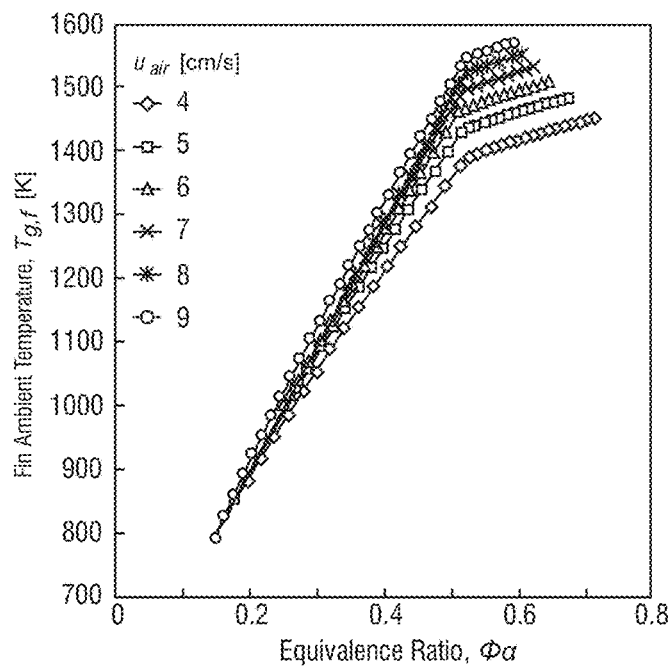
FIG. 21 is a graph showing variation of ambient temperature of the fins of the radiation rods for different fuel equivalence ratios and preheater air velocities.

FIG. 21 shows the gas temperatures at the location where the fins of the radiation rods are located. It is shown from the figure that as the preheater air velocity (combustion heat input) is increased, the gas temperature is rather slowly increased. This is also evidenced by the fact that the flame moves close to the burner inlet and more radiation is lost as the preheater air velocity is increased (FIG. 20). Note that the maximum solid temperatures of all data points in FIG. 21 are below 1600 K.

Figure 22:
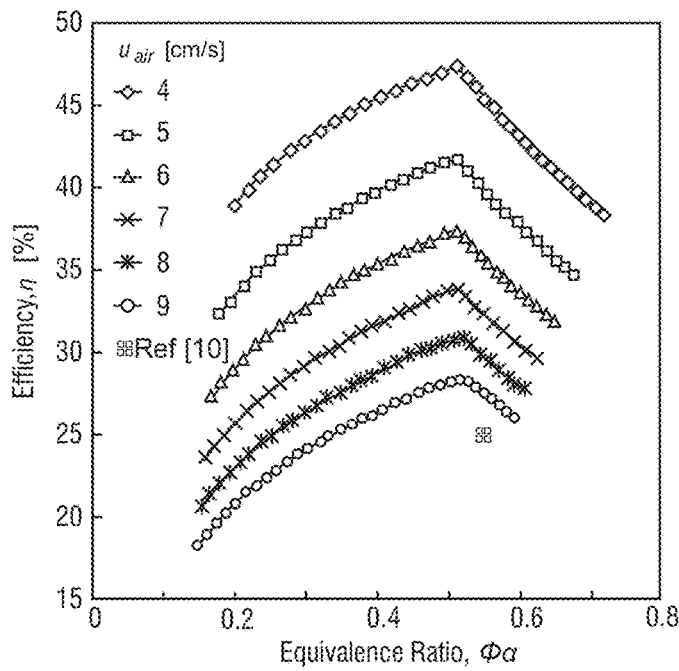
FIG. 22 is a graph showing variation of the thermal efficiency with different fuel equivalence ratios and preheater air velocities.

The thermal efficiencies of the superadiabatic radiant burner at various equivalence ratios and preheater air velocities are shown in FIG. 22. It is clearly shown that there is an optimum equivalence ratio around 0.5 regardless of preheater air velocity. The thermal efficiency is increased with the equivalence ratio until the flame moves to the burner inlet and thus more radiation loss occurs. It is also shown that the thermal efficiencies of the superadiabatic burner are significantly higher than that of the conventional burner which is about 25%. This big improvement in the thermal efficiency attributes to the preheating by the flue gas and the efficient heat transfer through the radiation rods at a higher temperature than the flue gas.

CONCLUSIONS

A novel superadiabatic radiant porous burner using a preheater and radiation rods was presented and was numerically analyzed. The numerical results showed that thermal efficiency over 45% can be achieved. In the radiant burner, a preheater was used to externally recover the heat from the flue gas and increase the inlet air temperature so that the burner could operate at more fuel lean conditions than the conventional burners. The radiation rods, made of a metallic material (carbon steel) of high thermal conductivity, were used to transfer the combustion heat directly to the radiating surface at higher temperature than that of the flue gas. It was shown that combining the internal heat recirculation found in the conventional porous burners with the external heat recovery of the preheater and efficient heat transfer through the radiation corridors, allows the superadiabatic radiant burner to achieve higher radiating surface than the flue gas temperature and near the adiabatic flame temperature. As a result, a significant improvement in the thermal efficiency for the superadiabatic radiant burner is achieved as compared to the conventional porous burner.

It is to be understood that the above discussion provides a detailed description of various embodiments. The above descriptions will enable those skilled in the art to make many departures from the particular examples described above to provide apparatuses constructed in accordance with the present disclosure. The embodiments are illustrative, and not intended to limit the scope of the present disclosure. The scope of the present disclosure is rather to be determined by the scope of the claims as issued and equivalents thereto.

What is claimed is:

1. A superadiabatic burner comprising:
   a flame holder formed from a second porous medium;
   a first porous medium adjacent the second porous medium;
   a radiating surface formed on an outer surface of the burner;
   a fuel inlet directly connected to the first porous medium;
   a preheater coupled to the flame holder and comprising an inlet, and an outlet directly connected to the first porous medium;
   a radiating rod having a first end disposed within the preheater and a second end disposed within the flame holder, the first end extending to the radiating surface, wherein the radiating rod is configured to provide net radiation of heat proximate the radiating surface, the heat being at a higher temperature than flue gas exiting the burner; and
   a radiating disk coupled to the first end of the radiating rod, the radiating disk disposed at the radiating surface.

2. The burner of claim 1, wherein the first porous medium has a porous structure finer than the porous structure of the second porous medium.

3. The burner of claim 1, wherein the second porous medium has a more coarse porous structure than the first porous medium.

4. The burner of claim 1, wherein the radiating rod is coated with a material having a lower thermal conductivity than the radiating rod.

5. The burner of claim 1, further comprising a housing, wherein the first porous medium, the second porous medium, the preheater outlet, and first ends of the radiating rods being disposed within an upstream portion of the housing, the preheater comprises one or more passageways, and the one or more passageways and second ends of the radiating rods are disposed within a downstream portion of the housing.

6. The burner of claim 1, wherein the second end of the radiating rod directly absorbs heat from a flame disposed within the flame holder.

7. The burner of claim 1, wherein the second end of the radiating rod comprises a plurality of fins extending into the second porous medium.

8. The burner of claim 1, wherein the fuel inlet and the preheater outlet are separate components.

9. The burner of claim 1, wherein the radiating rod passes through the preheater.

10. A superadiabatic burner comprising:
    a flame holder formed from a second porous medium;
    a first porous medium adjacent the second porous medium;
    a radiating surface formed on an outer surface of the burner;
    a fuel inlet in fluid communication with the first porous medium;
    a preheater coupled to the flame holder and comprising an inlet, and an outlet in fluid communication with the first porous medium;
    a radiating rod having a first end disposed within the preheater and a second end disposed within the flame holder, the first end extending to the radiating surface, wherein the radiating rod is configured to provide net radiation of heat proximate the radiating surface, the heat being at a higher temperature than flue gas exiting the burner; and
    a radiating disk coupled to the first end of the radiating rod, the radiating disk disposed at the radiating surface.

* * * * *